(12) United States Patent
Muthusubramanian

(10) Patent No.: US 10,704,817 B2
(45) Date of Patent: Jul. 7, 2020

(54) CAPACITY STAGING SYSTEM FOR MULTIPLE COMPRESSORS

(71) Applicant: Emerson Climate Technologies, Inc., Sidney, OH (US)

(72) Inventor: Kamalakkannan Muthusubramanian, Troy, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 120 days.

(21) Appl. No.: 15/988,759

(22) Filed: May 24, 2018

(65) Prior Publication Data
US 2019/0101314 A1 Apr. 4, 2019

Related U.S. Application Data

(60) Provisional application No. 62/568,088, filed on Oct. 4, 2017.

(51) Int. Cl.
*F25B 49/02* (2006.01)
*F25B 41/00* (2006.01)
(Continued)

(52) U.S. Cl.
CPC .......... *F25B 49/022* (2013.01); *F25B 41/003* (2013.01); *F25B 41/04* (2013.01); *F24F 2110/10* (2018.01); *F24F 2110/12* (2018.01); *F25B 2400/0751* (2013.01); *F25B 2500/19* (2013.01); *F25B 2600/025* (2013.01); *F25B 2600/0251* (2013.01);
(Continued)

(58) Field of Classification Search
CPC ...... F25B 49/022; F25B 41/04; F25B 41/003; F25B 2700/2104; F25B 2500/19; F25B 2400/0751; F25B 2600/0261; F25B 2700/2106; F25B 2600/0253; F25B 2600/0251; F25B 2600/0262; F25B 2700/21; F25B 2700/02; F25B 2600/025; F25B 1/00; F24F 2110/10; F24F 2110/12
See application file for complete search history.

(56) References Cited

U.S. PATENT DOCUMENTS 3,348,607 A * 10/1967 Cootey .............. G05D 23/1931
62/208
7,555,913 B2 7/2009 Hwang et al.
(Continued)

FOREIGN PATENT DOCUMENTS

KR 20050112802 A 12/2005

OTHER PUBLICATIONS

International Search Report regarding International Application No. PCT/US2018/054175 dated Jan. 31, 2019.
(Continued)

*Primary Examiner* — Emmanuel E Duke
(74) *Attorney, Agent, or Firm* — Harness, Dickey & Pierce, P.L.C.

(57) ABSTRACT

A control system for controlling an output for at least one compressor includes a control unit that receives an indoor set point and an outdoor ambient temperature. The control unit determines a load request based on the indoor set point and the outdoor ambient temperature without considering an indoor room temperature. The at least one compressor receives control commands from the control unit based on the load request.

20 Claims, 8 Drawing Sheets

(51) Int. Cl.
  *F25B 41/04*   (2006.01)
  *F24F 110/12*  (2018.01)
  *F24F 110/10*  (2018.01)

(52) U.S. Cl.
  CPC ............. *F25B 2600/0253* (2013.01); *F25B 2600/0261* (2013.01); *F25B 2600/0262* (2013.01); *F25B 2700/02* (2013.01); *F25B 2700/21* (2013.01); *F25B 2700/2104* (2013.01); *F25B 2700/2106* (2013.01)

(56) References Cited

U.S. PATENT DOCUMENTS

| | | | |
|---|---|---|---|
| 10,072,856 B1* | 9/2018 | Akin | F24D 12/02 |
| 2005/0262860 A1 | 12/2005 | Hwang et al. | |
| 2008/0041081 A1 | 2/2008 | Tolbert | |
| 2012/0125559 A1 | 5/2012 | Fadell et al. | |
| 2015/0105919 A1 | 4/2015 | Chamorro et al. | |
| 2015/0276276 A1* | 10/2015 | Goel | F25B 49/022 62/79 |
| 2015/0276495 A1* | 10/2015 | Smullin | G01K 3/04 702/130 |
| 2015/0276508 A1* | 10/2015 | Smullin | G01H 1/00 702/130 |
| 2016/0290672 A1* | 10/2016 | Arensmeier | F24F 11/30 |
| 2017/0089603 A1 | 3/2017 | Bentz et al. | |

OTHER PUBLICATIONS

Written Opinion regarding International Application No. PCT/US2018/054175 dated Jan. 31, 2019.

* cited by examiner

| Number of Discrete Operating Modes | Fixed Capacity Compressors | Combination Fixed/2-Stage Compressors |
|---|---|---|
| Even Tandem | 2<br>(2 fixed capacity compressors) | 5<br>(1 2-stage and 1 fixed capacity) |
| Even Trio | 3<br>(3 fixed capacity compressors) | 8<br>(1 2-stage and 2 fixed capacity) |
| Uneven Tandem | 6<br>(2 fixed capacity compressors) | 8<br>(1 2-stage and 1 fixed capacity) |
| Uneven Trio | 7<br>(3 fixed capacity compressors) | 18<br>(1 2-stage and 2 fixed capacity) |

FIG. 3

| Position Compressor | A Two-Stage (83k BTU/hr) | B Fixed (76k BTU/hr) | C Fixed (91k BTU/hr) |
|---|---|---|---|
| 1 | -1 | 1 | 1 |
| 2 | -1 | 1 | 1 |
| 3 | 0 | 1 | 1 |
| 4 | -1 | 1 | 0 |
| 5 | -1 | 0 | 0 |
| 6 | -1 | 0 | 1 |
| 7 | 0 | 1 | 1 |
| 8 | 0 | 0 | 0 |
| 9 | -1 | 0 | 1 |
| 10 | -1 | 0 | 0 |
| 11 | -1 | 0 | 0 |

| KEY | |
|---|---|
| 1 | Full Load |
| 0 | Off |
| -1 | UT Modulated Load |

FIG. 4

| AY2 | 55 | 60 | 65 | 70 | 75 | 80 | 85 | 90 | 95 |
|---|---|---|---|---|---|---|---|---|---|
| BY2 | 45 | 40 | 35 | 30 | 25 | 20 | 15 | 10 | 5 |
| AY1 | 36.85 | 40.2 | 43.55 | 46.9 | 50.25 | 53.6 | 56.95 | 60.3 | 63.65 |
| BY1 | 30.15 | 26.8 | 23.45 | 20.1 | 16.75 | 13.4 | 10.05 | 6.7 | 3.35 |
| AY2 + BY2 | 100 | 100 | 100 | 100 | 100 | 100 | 100 | 100 | 100 |
| AY1 + BY1 | 67 | 67 | 67 | 67 | 67 | 67 | 67 | 67 | 67 |
| AY2 + BY1 | 85.15 | 86.8 | 88.45 | 90.1 | 91.75 | 93.4 | 95.05 | 96.7 | 98.35 |
| AY1 + BY2 | 81.85 | 80.2 | 78.55 | 76.9 | 75.25 | 73.6 | 71.95 | 70.3 | 68.65 |

FIG. 5

CAPACITY STAGING SYSTEM FOR MULTIPLE COMPRESSORS

CROSS-REFERENCE TO RELATED APPLICATIONS

This application claims the benefit of U.S. Provisional Application No. 62/568,088, filed on Oct. 4, 2017. The entire disclosure of the above application is incorporated herein by reference.

FIELD

The present disclosure relates to a compressor control system, and, more particularly to a capacity staging system for compressors based on a predicted load.

BACKGROUND

This section provides background information related to the present disclosure which is not necessarily prior art.

Compressors are used in a wide variety of industrial and residential applications to circulate refrigerant within a refrigeration, heat pump, HVAC, or chiller system (generically referred to as "refrigeration systems") to provide a desired heating and/or cooling effect. In any of the foregoing systems, the compressor should provide consistent and efficient operation to ensure that the particular refrigeration system functions properly.

Compressor systems may include multiple compressors connected together for increased efficiency and capacity modulation. The compressors have the capability to operate together or individually, delivering different capacity steps as needed. System capacity can be modulated by using multiple refrigeration circuits or by using multiple compressors in a single-circuit. For example, in a four compressor system, frequently used in packaged rooftops, individual compressors can be turned on and off or be set to different capacity levels to achieve different outputs.

Typically thermostat based controllers stage the compressor based on a sensible demand which is determined based on the thermostat set temperature and process value. There are other control systems which are based on outdoor air temperatures (OAT). In this case the OAT set temperature and process value together determine the sensible demand. Instead of OAT or Indoor thermostat, some other measurable parameter such as return air temperature (RAT) or supply air temperature (SAT) could also be used to determine the demand.

However, the disclosure herein addresses a new system and method for predicting the load either using an OAT sensor locally or more significantly, using the OAT data from reliable web portals/services such that a sensor could potentially be eliminated and the demand is calculated through a mathematical model.

SUMMARY

This section provides a general summary of the disclosure, and is not a comprehensive disclosure of its full scope or all of its features.

An embodiment of a control system for controlling an output for at least one compressor includes a control unit that receives an indoor set point and an outdoor ambient temperature. The control unit determines a load request based on the indoor set point and the outdoor ambient temperature without considering an indoor room temperature. The at least one compressor receives control commands from the control unit based on the load request.

The control system may further include at least one compressor receiving commands from the control unit based on a sensible load request.

The control system may further include at least one compressor receiving commands from the control unit based on a latent load request that takes into consideration a sensible load request and a relative humidity output from a humidity sensor.

The control system may further include a sensible load determination unit that determines a sensible load request from a sensible load model that takes into consideration the indoor set point, the outdoor ambient temperature, and at least one of a type and a location of a plurality of building walls, a size of the building, a number and a size of a plurality of building rooms, a number, a size, and a location of a plurality of building windows, a number and a location of a plurality of air conditioning vents, an amount, a type, and a location of insulation, a type of furniture, a regional location of the building, a number of people living or working in the building, a number of electronics used in the building, and a sun load on the building.

The control system may further include an output correction unit that modifies an output based on the sensible load request to account for the relative humidity to derive a latent load request.

The control system may further include a control unit that commands at least one compressor to the latent load request.

The control system may further include a control unit that commands at least one compressor to the sensible load request.

The control system may further include a sensible load determination unit that generates a sensible load request from a sensible load model determined based on a database of models calculated based on simulations of sensible loads in buildings located in a plurality of climate regions.

The control system may further include a sensible load determination unit that generates a sensible load request from a sensible load model retrieved from a sensible load database stored on a server remote from the control system.

The control system may further include an outdoor ambient temperature determined from a signal from a temperature sensor.

The control system may further include an outdoor ambient temperature provided from a web based service providing live outdoor ambient temperature data.

The control system may further include an indoor set point received from a user interface.

The control system may further include an indoor set point or an outdoor ambient temperature received from a connected device.

The control system may further include an indoor set point received from a schedule saved in a memory in the control unit.

An embodiment of a method for controlling an output for at least one compressor includes receiving, by the controller, an indoor set point and an outdoor ambient temperature; determining, by the controller, a load request based on the indoor set point and the outdoor ambient temperature without considering an indoor room temperature; and controlling, by the controller, at least one compressor based on the load request.

The method may further include controlling, by the controller, the at least one compressor based on a sensible load request.

The method may further include controlling, by the controller, the at least one compressor based on a latent load request determined from a sensible load request and a relative humidity output from a humidity sensor.

The method may further include determining, by the controller, a sensible load request from a sensible load model that takes into consideration the indoor set point, the outdoor ambient temperature, and at least one of a type and a location of a plurality of building walls, a size of the building, a number and a size of a plurality of building rooms, a number, a size, and a location of a plurality of building windows, a number and a location of a plurality of air conditioning vents, an amount, a type, and a location of insulation, a type of furniture, a regional location of the building, a number of people living or working in the building, a number of electronics used in the building, and a sun load on the building.

The method may further include generating, by the controller, a sensible load request from a sensible load model determined based on a database of models calculated based on simulations of sensible loads in buildings located in a plurality of climate regions.

The method may further include generating, by the controller, a sensible load request from a sensible load model retrieved from a sensible load database stored on a server remote from the control system.

The method may further include determining, by the controller, the outdoor ambient temperature based on a signal from one of a temperature sensor and a web based service providing live outdoor ambient temperature data.

The method may further include determining, by the controller, the indoor set point based on a signal from one of a thermostat, a computer application, a phone application, and a schedule saved in a memory of the controller.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a chart illustrating a number of example operating modes for a variety of example compressor systems.

FIG. 4 is a table illustrating the possible operating modes for an example uneven trio compressor system.

FIG. 5 is a table of loads for the different stages of an example multi-linked compressor system.

Corresponding reference numerals indicate corresponding parts throughout the several views of the drawings.

DETAILED DESCRIPTION

Example embodiments will now be described more fully with reference to the accompanying drawings.

Currently, thermostat based controllers stage compressor systems based on an estimated load. There is a general assumption that one indoor sensor can account for load components due to indoor and outdoor factors. Such controllers use a single sensor input to estimate load, even though the load is due to multiple factors, such as indoor factors and outdoor factors.

Model based staging is used to capture the indoor and outdoor load components simultaneously in the form of a load equation that is derived from field data and/or simulations. Such load equations are also made available by a National lab. Such an equation may then be expressed as a function of just one parameter, i.e. outdoor ambient temperature (OAT). While OAT is provided an example parameter, it is understood that the equation may be expressed as a function of some other single parameter. Additionally, while the equation is described as being expressed as a function of just one parameter, it is understood that the equation could also be developed as a function of two or more parameters, with example parameters being temperature and relative humidity (or any other two or more parameters). The capacity staging system described below incorporates the use of model based staging to stage the compressors in the system such that the staging of the compressors takes into account the indoor and outdoor load components simultaneously.

The capacity staging system described herein is advantageous because the sensible load provided by the model is a true representation of the compressor load required. When the model used to determine the sensible load is determined by a National lab, the model is highly accurate and its accuracy has been validated by studying numerous commercial buildings across all climate regions. Thus, the model and sensible load determined therefrom provide a true representation of how a heating, ventilation, and air conditioning (HVAC) system should run. Additionally, the capacity staging system described herein eliminates the need for temperature sensors and thermostats, eliminating the customer's expense in purchase and maintenance for these components.

Figure 1:
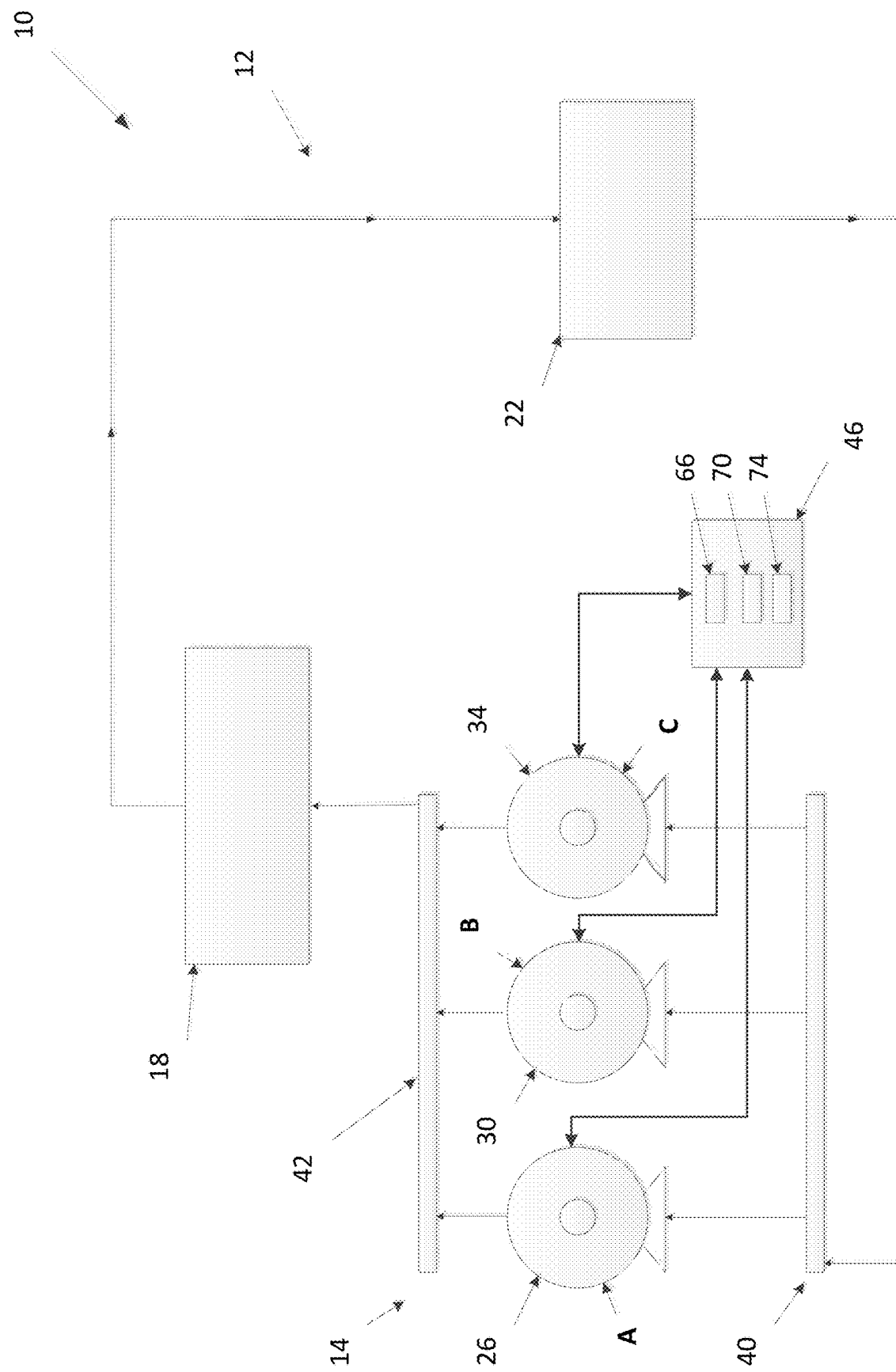
FIG. 1 is a schematic of a compressor system according to the present disclosure.

With reference to FIG. 1, a compressor system 10 is provided. The compressor system 10 may be used in conjunction with a heating, ventilation, and air conditioning (HVAC) system or refrigeration system 12 including one or more compressors or multiple linked or connected compressors 14, a condenser 18, and an evaporator 22. While the refrigeration system 12 is described and shown as including multi-linked compressors 14, the condenser 18, and the evaporator 22, the refrigeration system 12 may include additional and/or alternative components (for example only, only one compressor and an expansion valve). Further, the present disclosure is applicable to various types of refrigeration systems including, but not limited to, heating, ventilating, air conditioning (HVAC), heat pump, refrigeration, and chiller systems. Further, the present disclosure is also applicable to both commercial and residential applications.

During operation of the refrigeration system 12, the multi-linked compressors 14 circulate refrigerant generally between the condenser 18 and the evaporator 22 to produce a desired heating and/or cooling effect. Specifically, the multi-linked compressors 14 receive refrigerant in vapor form and compress the refrigerant. The multi-linked compressors 14 provide pressurized refrigerant in vapor form to the condenser 18.

All or a portion of the pressurized refrigerant received from the multi-linked compressors 14 may be converted into a liquid state within the condenser 18. Specifically, the condenser 18 transfers heat from the refrigerant to the surrounding air, thereby cooling the refrigerant. When the refrigerant vapor is cooled to a temperature that is less than a saturation temperature, the refrigerant changes state from a vapor to a liquid. The condenser 18 may include a condenser fan (not illustrated) that increases the rate of heat transfer away from the refrigerant by forcing air across a heat-exchanger coil associated with the condenser 18.

The refrigerant may pass through an expansion valve (not illustrated) that expands the refrigerant prior to reaching the evaporator 22. The evaporator 22 may receive a mixture of vapor refrigerant and liquid refrigerant or purely liquid refrigerant from the condenser 18. The refrigerant absorbs heat in the evaporator 22. Accordingly, liquid refrigerant disposed within the evaporator 22 changes state from a liquid to a vapor when warmed to a temperature that is greater than or equal to the saturation temperature of the refrigerant. The evaporator 22 may include an evaporator fan (not illustrated) that increases the rate of heat transfer to the refrigerant by forcing air across a heat-exchanger coil associated with the evaporator 22.

As the liquid refrigerant absorbs heat, the ambient air disposed proximate to the evaporator 22 is cooled. The evaporator 22 may be disposed within a space to be cooled such as a building or refrigerated case where the cooling effect produced by the refrigerant absorbing heat is used to cool the space. The evaporator 22 may also be associated with a heat-pump refrigeration system where the evaporator 22 may be located remotely from the building such that the cooling effect is lost to the atmosphere and the rejected heat generated by the condenser 18 is directed to the interior of a space to be heated.

Figure 2:
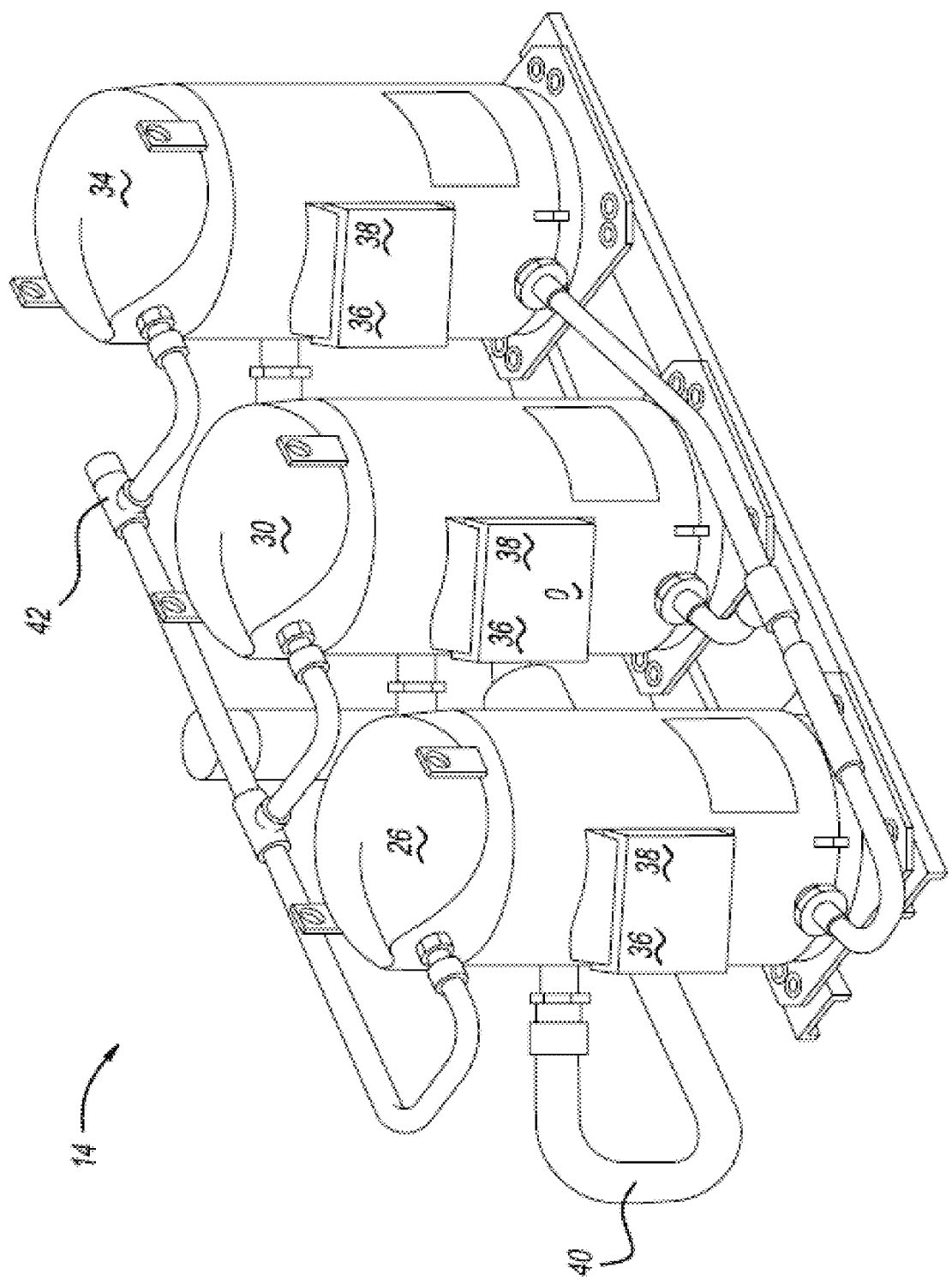
FIG. 2 is a perspective view of an example of multiple compressors of the compressor system of FIG. 1.

Referring additionally to FIG. 2, the multi-linked compressors 14 may further include two or more compressors 26, 30, 34 connected in parallel. Each of the compressors 26, 30, 34 of the multi-linked compressors 14 includes a plurality of solenoids 36 and contactors 38 that can be activated to control the compressor. For example only, the solenoids 36 and contactors 38 may be activated to run the compressor at full capacity or load or at a part capacity or load, where applicable. For example only, three compressors 26, 30, 34 are illustrated in FIGS. 1 and 2. While three compressors are illustrated and described, it is understood that any number of compressors may be included in the multi-linked compressors 14, including one compressor, two compressors, and more than three compressors. The compressors 26, 30, 34 share a single suction header or common suction line 40 and a single discharge header or common discharge line 42.

While a single circuit of multi-linked compressors is discussed and illustrated, it is understood that there may be multiple circuits in a single system. Each circuit in the system includes its own multi-linked compressors linked in tandem, trio, quad, or any other number. The circuits in a multi circuit system are independent but may run through a common evaporator and a common condenser. The output may be modulated by turning on the individual circuits separately or in combination with other circuits. Thus, the present disclosure is not limited to a single circuit of multi-linked compressors, but may be applied across any number of multiple circuits, each having multi-linked compressors.

The multi-linked compressors 14 may include one or more multi-stage compressors that are operable at multiple different capacity levels. Each of the compressors may be a scroll compressor, a reciprocating compressor, a screw compressor, a rotary compressor, a centrifugal compressor, or any other type of compressor. For example, a two-stage compressor operable at full capacity (or, in some embodiments, full scroll volume ratio) and at modulated capacity (in some embodiments, with a lower scroll volume ratio) can be used. The multi-stage compressor may utilize any manner of capacity modulation, including, but not limited to, two-step capacity modulation or continuous capacity modulation. In two-step capacity modulation, the compressor runs at either a full capacity (for example, 100% capacity) or a part capacity (for example only, 67% capacity or any selected or programmed capacity), depending on cooling and/or heating demand. For example, two-step capacity modulation may be accomplished with a delayed suction system that modulates compressor capacity by venting an intermediate pressurized chamber to the suction chamber, as described in U.S. Pat. No. 6,821,092, the disclosure of which is incorporated herein by reference. With continuous capacity modulation the capacity of the compressor can be modulated from 10-100 percent so that the output precisely matches the changing cooling requirements of the space. For example, a bypass valve and passage can be used to continuously modulate compressor capacity, without changing the speed of the motor. In a further example, continuous capacity modulation can be accomplished with a variable speed capacity modulation system that varies the speed of the compressor motor. The compressor motor speed determines the rate of refrigerant flow; thus, by varying the motor frequency, capacity can be modulated. Therefore, with a variable speed capacity modulation system, capacity output increases and decreases with motor speed. In a further example, continuous capacity modulation can be accomplished with a scroll separation capacity modulation system. In a scroll separation capacity modulation system, capacity control is achieved by separating the scroll sets axially over a small period of time. For example, a scroll separation capacity modulation system is described in U.S. Pat. No. 6,213,731, which is incorporated herein by reference. In addition, any of the continuous capacity modulated systems can also be operated in two discrete capacity steps to accomplish two-step capacity modulation. A two-stage compressor, because of its capacity modulation, has three different operating, or power, modes: off, full capacity, and modulated, or reduced, capacity.

The multi-linked compressors 14 may include fixed capacity compressors. A fixed capacity compressor is a compressor having a traditional scroll design with a single, standard built-in volume ration (BIVR). The fixed capacity compressor has two different operating, or power, modes: off and full capacity.

The multi-linked compressors 14 may include variable volume ratio compressors. A variable volume ratio compressor incorporates a bypass passage to eliminate over compression losses by porting compressed fluid though a bypass valve in a fixed scroll of the compressor. The variable volume ratio compressor has three different operating, or power, modes: off, full BIVR and capacity, and reduced scroll volume ratio. The variable volume ratio compressor may be a passive scheme or any other scheme. While the variable volume ratio compressor may be a passive scheme in terms of control, the variable volume ratio compressor adds additional complexity by adapting scroll volume ratio to meet needs. In multi-linked compressors, knowing which compressors have variable volume ratio designs and selectively turning them on and off can influence the overall system efficiency. Variable volume ratio compressors may offer higher efficiency over a larger range of system pressures, as compared with a compressor having an optimized fixed pressure ratio or a traditional fixed pressure ratio. The pressure ratio is calculated as discharge pressure over suction pressure.

The multi-linked compressors 14 may be compressors linked in parallel in even multiples or uneven multiples. Even multiples are parallel compressors of the same BIVR and capacity; whereas uneven multiples are parallel compressors of different BIVR and/or capacities. The multi-linked compressors 14 may also incorporate one or more of the types of two-stage modulated capacity compressors, continuous capacity modulated compressors, and fixed capacity compressors.

Now, referring to FIG. 3, examples of numbers of operating modes for various multi-linked compressor systems are shown. In some embodiments, the multi-linked compressors 14 may be an even tandem of fixed capacity compressors, meaning that the multi-linked compressors 14 may include two fixed capacity compressors having the same BIVR and capacity being linked in parallel. Because of the two operating modes for each of the two fixed capacity compressors, and the fact that the two fixed capacity compressors have the same BIVR and capacity, the even tandem of fixed capacity compressors has two total possible operating, or power, modes, excluding the operating mode where all compressors are off, i.e., the two operating, or power, modes being: (1) one compressor on; and (2) two compressors on.

In other embodiments, the multi-linked compressors 14 may be an even trio of fixed capacity compressors meaning that the multi-linked compressors 14 may include three fixed capacity compressors having the same BIVR and capacity being linked in parallel. Because of the two operating modes for each of the three fixed capacity compressors, and the fact that the three fixed capacity compressors have the same BIVR and capacity, the even trio of fixed capacity compressors has three total possible operating, or power, modes, excluding the operating mode where all compressors are off, i.e., the three operating, or power modes, being: (1) one compressor on; (2) two compressors on; and (3) three compressors on.

In other embodiments, the multi-linked compressors 14 may be an uneven tandem of fixed capacity compressors meaning that the multi-linked compressors 14 may include two fixed capacity compressors having different BIVR and capacities being linked in parallel. Because of the two operating modes for each of the two fixed capacity compressors, and the fact that the two fixed capacity compressors have different BIVR and capacities, the uneven tandem of fixed capacity compressors has three total possible operating, or power, modes, excluding the operating mode where all compressors are off, i.e., the three operating, or power, modes being: (1) lower capacity compressor on; (2) higher capacity compressor on; and (3) both compressors on.

In other embodiments, the multi-linked compressors 14 may be an uneven trio of fixed capacity compressors meaning that the multi-linked compressors 14 may include three fixed capacity compressors having different BIVR and capacities being linked in parallel. Because of the two operating modes for each of the three fixed capacity compressors, and the fact that the three fixed capacity compressors have different BIVR and capacities, the uneven trio of fixed capacity compressors has seven total possible operating, or power, modes, excluding the operating mode where all compressors are off, i.e., the seven operating, or power, modes being: (1) lowest capacity compressor on; (2) middle capacity compressor on; (3) highest capacity compressor on; (4) lowest and middle capacity compressors on; (5) lowest and highest capacity compressors on; (6) middle and highest capacity compressors on; and (7) all three compressors on.

In other embodiments, the multi-linked compressors 14 may be an even tandem of combination fixed and two-stage compressors, meaning that the multi-linked compressors 14 may include one two-stage compressor and one fixed capacity compressor, with both compressors having the same BIVR and capacity being linked in parallel. Because of the three operating modes for the two-stage compressor and the two operating modes for the fixed capacity compressor, and the fact that the two-stage and the fixed capacity compressors have the same BIVR and capacities, the even tandem of two-stage compressors has four total possible operating, or power, modes, excluding the operating mode where all compressors are off, i.e., the four operating, or power, modes being: (1) fixed capacity compressor on (or two-stage compressor on at high capacity); (2) two-stage compressor on at low capacity; (3) fixed capacity compressor on and two stage compressor on at low capacity; and (4) fixed capacity compressor on and two stage compressor on at high capacity.

In other embodiments, the multi-linked compressors 14 may be an even trio of combination fixed and two-stage compressors meaning that the multi-linked compressors 14 may include one two-stage compressor and two fixed capacity compressors having the same BIVR and capacity being linked in parallel. Because of the three operating modes for the two-stage compressor and the two operating modes for each of the fixed capacity compressors, and the fact that the two-stage and fixed capacity compressors have the same BIVR and capacity, the even trio of two-stage compressors has six total possible operating, or power, modes, excluding the operating mode where all compressors are off, i.e., the six operating, or power, modes being: (1) either fixed capacity compressor on (or two-stage compressor on at high capacity); (2) two-stage compressor on at low capacity; (3) one fixed capacity compressor on and two-stage compressor on at low capacity; (4) two fixed capacity compressors on (or one fixed capacity compressor and two-stage compressor on at high capacity); (5) two fixed capacity compressors on and two-stage compressor on at low capacity; and (6) two fixed capacity compressors on and two-stage compressor on at high capacity.

In other embodiments, the multi-linked compressors 14 may be an uneven tandem of combination fixed and two-stage compressors, meaning that the multi-linked compressors 14 may include one two-stage compressor and one fixed capacity compressor having different BIVR and capacities being linked in parallel. Because of the three operating modes for the two-stage compressor and the two operating modes for the fixed capacity compressor, and the fact that the two-stage and fixed capacity compressors have different BIVR and capacities, the uneven tandem of two-stage compressors has five total possible operating, or power, modes, excluding the operating mode where all compressors are off, the five operating, or power, modes being: (1) two-stage compressor on at low capacity; (2) fixed capacity compressor on (3) two-stage compressor on at high capacity; (4) fixed capacity compressor on and two-stage compressor on at low capacity; and (5) fixed capacity compressor on and two-stage compressor on at high capacity.

In other embodiments, the multi-linked compressors 14 may be an uneven trio of combination fixed and two-stage compressors, meaning that the multi-linked compressors 14 may include one two-stage compressor and two fixed capacity compressors having different BIVR and capacities being linked in parallel. Because of the three operating modes for the two-stage compressor and the two operating modes for each of the fixed capacity compressors, and the fact that the two-stage and fixed capacity tech compressors have different BIVR and capacities, the uneven trio of two-stage compressors has eleven total possible operating, or power, modes, excluding the operating mode where all compressors are off, the eleven operating, or power, modes being: (1) lower capacity fixed compressor on; (2) higher capacity fixed compressor on; (3) two-stage compressor on at low capacity; (4) two-stage compressor on at high capacity; (5) lower capacity fixed compressor on and higher capacity fixed compressor on; (6) lower capacity fixed compressor on and two-stage compressor on at low capacity; (7) lower capacity fixed compressor on and two-stage compressor on at high capacity; (8) higher capacity fixed compressor on and two-stage compressor on at low capacity; (9) higher capacity fixed compressor on and two-stage compressor on at high capacity; (10) lower capacity fixed compressor on, higher capacity fixed compressor on, and two-stage compressor on at low capacity; and (11) lower capacity fixed compressor on, higher capacity fixed compressor on, and two-stage compressor on at high capacity.

In other embodiments, the multi-linked compressors 14 may be a trio of uneven two-stage compressors comprising three two-stage compressors having different BIVR and capacities linked in parallel. Because of the three operating modes for each of the three two-stage compressors, and the fact that the two-stage compressors have different BIVR and capacities, the trio of two-stage compressors have twenty-six total possible operating, or power, modes, excluding the operating mode where all compressors are off, the twenty-six operating, or power, modes being: (1) lower capacity two-stage compressor on at high capacity; (2) lower capacity two-stage compressor on at low capacity; (3) middle capacity two-stage compressor on at high capacity; (4) middle capacity two-stage compressor on at low capacity; (5) higher capacity two-stage compressor on at high capacity; (6) higher capacity two-stage compressor on at low capacity; (7) lower and middle capacity two-stage compressors on at high capacity; (8) lower and middle capacity two-stage compressors on at low capacity; (9) lower capacity two-stage compressor on at high capacity and middle capacity two-stage compressors on at low capacity; (10) lower capacity two-stage compressor on at low capacity and middle capacity two-stage compressors on at high capacity; (11) lower and higher capacity two-stage compressors on at high capacity; (12) lower and higher capacity two-stage compressors on at low capacity; (13) lower capacity two-stage compressor on at high capacity and high capacity two-stage compressors on at low capacity; (14) lower capacity two-stage compressor on at low capacity and high capacity two-stage compressors on at high capacity (15) middle and higher capacity two-stage compressors on at high capacity; (16) middle and higher capacity two-stage compressors on at low capacity; (17) middle capacity two-stage compressor on at high capacity and high capacity two-stage compressors on at low capacity; (18) middle capacity two-stage compressor on at low capacity and high capacity two-stage compressors on at high capacity (19) lower, middle, and higher capacity two-stage compressors on at high capacity; (20) lower, middle, and higher capacity two-stage compressors on at low capacity; (21) lower and middle capacity two-stage compressors on at high capacity and higher capacity two-stage compressor on at low capacity; (22) lower and higher capacity two-stage compressors on at high capacity and middle capacity two-stage compressor on at low capacity; (23) middle and higher capacity two-stage compressors on at high capacity and lower capacity two-stage compressor on at low capacity; (24) lower and middle capacity two-stage compressors on at low capacity and higher capacity two-stage compressor on at high capacity; (25) lower and higher capacity two-stage compressors on at low capacity and middle capacity two-stage compressor on at high capacity; and (26) middle and higher capacity two-stage compressors on at low capacity and lower capacity two-stage compressor on a high capacity.

Now referring to FIG. 4, an example table illustrating the possible operating modes for an uneven trio compressor system (described above), is shown. The total possible operating modes is determined based on the number of possible operating modes for each of the compressors and whether the compressors have the same or different BIVR and capacities. In an example embodiment, the uneven trio of two-stage compressors shown in FIG. 4 has one two-stage compressor (for example, a two-stage compressor with a 83,000 BTU/hr capacity) and two fixed capacity compressors with different BIVR and capacities (for example, a fixed capacity compressor with a 76,000 BTU/hr capacity and a fixed capacity compressor with a 91,000 BTU/hr capacity) being linked in parallel. With this combination of compressors, there are eleven total possible operating modes, depicted by the eleven rows in FIG. 4. Each possible operating mode is identified in FIG. 4. With reference to the Key, the two-stage compressor has the possibility of being off (0), at a full BIVR and capacity (1), or at a lower or modulated capacity (−1). Each of the fixed capacity compressors has the possibility of being off (0) or at full BIVR and capacity (1). Thus, the different combinations of compressor on/off/modulated modes are combined to make the total eleven possible operating modes, excluding the operating mode where all compressors are off.

While the fixed capacity even tandem, fixed capacity even trio, fixed capacity uneven tandem, fixed capacity uneven trio, two-stage even tandem, two-stage even trio, two-stage uneven tandem, and two-stage uneven trio are discussed above, it is understood that any combination of two-stage, multi-stage, fixed capacity, and variable valve compressors may be combined in parallel for the multi-linked compressors 14. The total number of possible operating modes for the multi-linked compressor 14 is determined based on the number of possible operating modes for each of the compressors and whether the compressors have the same or different full BIVR and capacities. Since the variable valve compressors offer operating modes for every level of capacity between 10 and 100%, the number of operating modes for a multi-linked compressor 14 including a variable valve compressor is infinite.

Now referring to FIG. 5, an example table of capacity levels for the different stages of a multi-linked compressor system is illustrated. In the example table, the different stages of a multi-linked compressor system having a first two-stage compressor A and a second two stage compressor B, each with a low stage Y1 and a high stage Y2, is shown. The use of a pair of two-stage compressors in tandem provides eight capacity stages. The eight stages can be defined by the equations in the following table:

| 100% | 67 + 0.33Q | 100 − 0.33Q | Q | 67 | 0.67Q | 100 − Q | 67 − 0.67Q |
|------|------------|-------------|---|----|----|---------|------------|

In the table of FIG. 5, the top two rows, AY2 and BY2, list the load options for the high stages (Y2) of each compressor A and B. The sum of the AY2 and BY2 value in each column (as illustrated in the 5$^{th}$ row) is always 100. Thus, if the value for AY2 is Q, then the value for BY2 is 100−Q.

The next two rows, the third and fourth rows, list the load options for the low stages (Y1) of each compressor A and B. While the sum for the loads of the high stages of the compressors A and B must be 100, the sum for the loads of the low stages of the compressors A and B is not 100. Instead, the sum of the AY1 and BY1 value in each column (as illustrated in the 6$^{th}$ row) is always 67. While 67 is provided as an example part-capacity value in FIG. 5, it is understood that any part-capacity value may be used. Thus, if the value for AY1 is Q, then the value for BY1 is 67−Q.

The last two rows, the seventh and eighth rows, list the load options for combinations of the compressor A in high stage (AY2) and compressor B in low stage (BY1) (7$^{th}$ row) and the compressor A in low stage (AY1) and compressor B in high stage (BY2) (8$^{th}$ row).

In some embodiments, the eight stages may be separated out, dedicating some of the stages for sensible load demand and dedicating others of the stages for latent load demand. A sensible stage is used when only temperature is considered as a factor in requesting the compressor load. A latent stage is used when a second input (for example, relative humidity) is considered as an additional factor in requesting the compressor load. As shown in FIG. 5, there may be redundant stages having the same or similar capacity levels in many of the combinations. For example, in the second column, there is an 85.15 and an 81.85 for AY2+BY1 and AY1+BY2, respectively. Similarly, there is a 30.15 and a 36.85, for BY1 and AY1, respectively. Because the capacity levels are similar, the original eight stages can be treated as six sensible stages and two latent stages. Here, the 85.15 and 36.85 can become dedicated latent stages which will be run when latent loads are present and, simultaneously, the sensible load is in the vicinity of 80% or 30%. Similarly, the 81.85 and 30.15 can become dedicated sensible stages.

Figure 6:
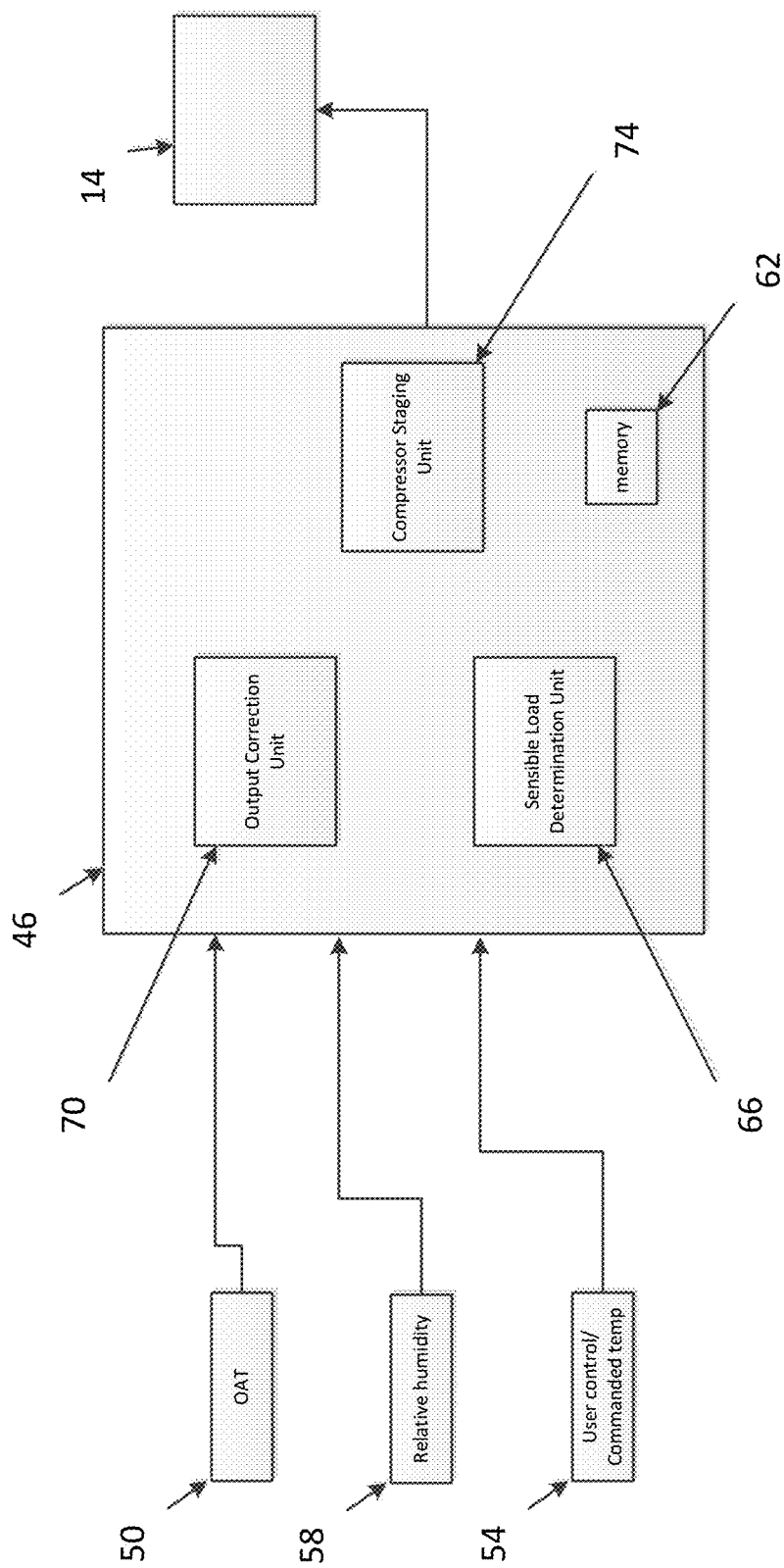
FIG. 6 is a schematic of a control system for the compressor system of FIG. 1.

Referring to FIGS. 1, 2, and 6, a system controller 46 may be associated with the compressor system 10 and/or the multi-linked compressors 14 and may command start up, stabilization, shut down, more capacity, and less capacity for each of the multi-linked compressors 14 and/or the refrigeration system 12 based on a commanded compressor load. While the system controller 46 is shown as being associated with the multi-linked compressors 14, the system controller 46 could be located anywhere within or outside of the refrigeration system 12.

The system controller 46 may receive an outdoor ambient temperature (OAT) 50, a user commanded temperature (or indoor set point) 54, and, in some cases, a relative humidity 58, for example. The OAT 50 may be received from an OAT sensor 50, from a web based service providing live OAT data, or from any connected device. In the second case, the web based service provides real-time, live OAT data and removes the necessity for an OAT sensor, further reducing costs and maintenance. The user commanded temperature 54 may be provided from a thermostat 54, from a computer or phone application (app), from any connected device, or from a schedule saved in a memory 62 in the system controller 46. In the cases of the user commanded temperature 54 being provided from the app or the schedule, the need for a physical thermostat or temperature sensor within the area to be cooled, such as the interior of a building, is eliminated, further reducing costs and maintenance. The relative humidity 58 may be supplied for determining latent loads. The relative humidity 58 may be received from an indoor humidity sensor 58. In some circumstances, the relative humidity 58 may be received from a web based service providing live humidity data, or from any connected device that receives or determines relative humidity data. In the second case, the web based service provides real-time, live humidity data and removes the necessity for a humidity sensor, further reducing costs and maintenance.

The capacities for the different stages for each compressor in the multi-linked compressors 14 are stored in the memory 62. The capacities may be determined using system design simulation (SDS) software, Engineering Equation Solver® (EES) programming, MATLAB® programming, Heat Pump design model software (for example, the software developed by Oakridge National lab), experiments, field tests, or any other method. For example, referring additionally to FIG. 5, if the multi-linked compressors include a first two-stage compressor in the A position and a second two-stage compressor in the B position, each having a low stage Y1 and a high stage Y2, the various capacities in the chart in FIG. 5 will be stored within the memory 62.

The system controller 46 may include a sensible load determination unit 66, an output correction unit 70, and a compressor staging unit 74, in addition to the memory 62. The sensible load determination unit 66 may receive the user commanded temperature 54 and the OAT 50 and determine a sensible load.

The sensible load may be determined from a sensible load model. The sensible load model may be a user-determined model or may be a model generated by a national organization or laboratory. For example, the sensible load may be determined from the following equation:

$$\text{Sensible load} = b + m^*(\text{OAT} - \text{Indoor Set Point})$$

where the sensible load is in Btu/hr, the OAT is the OAT 50, the Indoor Set Point is the user commanded temperature 54, m is a slope, and b is a y-intercept determined based on the type and location of the building. The values of m and b will change for different building energy models. Example values for m and b may be 17.75 and 362.07, respectively. The sensible load equation using m=17.75 and b=362.07 is an example equation for a medium office building and the slope and intercept of this linearized equation may vary based on the physical parameters of the structure. While the sensible load equation is described as a linear equation, it is not necessary that the equation be linear, and the sensible load equation could be any higher order equation. Further, while the sensible load equation is provided as a function of only one variable (i.e., only one variable is shown on the right hand side of the above equation), it is not necessary that the sensible load be a function of just one variable, For example, the sensible load equation could provide a sensible load value as a function of multiple variables. Further, while the sensible load equation is provided as a single equation, it is possible that instead of one equation, the sensible load equation may be a group of simultaneous equations that can predict the load contributions of individual factors.

The sensible load equation is determined using physical parameters of the building such as, for example, the type and location of the walls, the size of the building, the number and sizes of rooms, the number, sizes, and location of windows, the number and location of the air conditioning vents, the amount, type, and location of insulation, the type of furniture, etc. The sensible load equation also may take into account the regional location of the building, the number of people living and/or working in the building, the number of electronics used in the building, and the sun load on the building. Thus, the sensible load equation provides a load line that is a true representation of the intensity at which the HVAC system should operate.

The sensible load equation may be generated using building energy modeling software such as, for example, Energy Plus®. Using the energy modeling software, the load profile of a building for an entire season can be predicted. By generating the sensible load equation using building energy modeling software, a specific equation can be developed for each customer, taking into consideration each customer's specific needs. Additionally, as many or as few variables in the physical parameters and/or building characteristics can be implemented to affect the degree of accuracy of the equation.

In other embodiments, the sensible load equation can be obtained through a national laboratory, such as, for example, the Pacific Northwest National Laboratory (PNNL). The PNNL has run E+® simulations as well as collected performance data from buildings across the nation and summarized the data to give out a sensible load line for various building types and regions. PNNL's load lines account for both the indoor and the outdoor component of sensible load. The PNNL load line is provided as a function of OAT and has a very high accuracy to predict the sensible load. However, the PNNL sensible load line may need some massaging or revising to achieve an appropriate load line for a specific region, based on the design dry bulb temperature (DBT)/wet bulb temperature (WBT) of the region. The design DBT/WBT data is also available through PNNL. The system controller 46, for example, may include a network communication module or interface enabling the system controller to access the internet and obtain a particular model, such as a PNNL model, from a server, such as a server operated by PNNL. In such case, the system controller 46 may receive data about the building to be cooled by the HVAC system through user input. For example, the user may input information about the size and type of the building and the system controller 46 may then use the inputted information to obtain a particular model corresponding to the particular building to be cooled based on the user input.

The PNNL load line is highly accurate and its accuracy has been validated by studying numerous commercial buildings across all climate regions. Thus, the PNNL load line provides a true representation of how a heating, ventilation, and air conditioning (HVAC) system should run.

It is understood that the present disclosure (and generation and use of the sensible load model) is independent of the configuration of the compressor system 10. While a majority of the present disclosure describes a plurality of compressors, the present disclosure (and generation and use of the sensible load model) may extend to system configurations with a single compressor, such as, for example, in residential system configurations. For single-compressor systems, one of the following example options may arise. First, the single-compressor configuration may have some form of unloading, due to the single compressor being a multi-stage compressor, variable-capacity compressor, or digital compressor, or, alternatively, the unloading may happen due to other system components, such as a multi-speed fan, a variable-speed fan, etc. In this type of system, the treatment may be similar to the plurality of compressor case, described herein, where there are multiple capacity lines and one sensible load model (for example, FIG. 7 discussed below) and these two together are used to effectively control the system. Second, the single compressor configuration may have no form of unloading. In this type of system, there is a single load line and a single capacity line. Here, the evaluation is performed to determine whether the system should be turned ON or turned OFF. The evaluation may be done using the model predicted load line which effectively replaces the more common thermostat-based control or other forms of controls that use sensors to do the same.

The sensible load determination unit 66 may further determine an output based on the sensible load on which to base the compressor staging. The sensible load determination unit may determine the output based on the determined sensible load, as discussed above. For example, referring to FIG. 7, an example graph illustrating capacity lines 78, 80, 82, 84 and a load line 86 for determining the sensible load is provided. This graph may correlate with the embodiment of the even tandem of two-stage compressors in FIG. 3. The capacity lines 78, 80, 82, 84 represent the different operating combinations for a system across a temperature (OAT) range. Capacity line 78 represents the lowest capacity where the two-stage compressor is operating at low capacity and the fixed compressor is off. Capacity line 80 represents the capacity where the fixed compressor is on or the two-stage compressor is at full capacity. Capacity line 82 represents the capacity where the fixed compressor is on and the two-stage compressor is at low capacity. Capacity line 84 represents the highest capacity where the fixed compressor is on and the two-stage compressor is at high capacity.

Load line 86 represents the Sensible load=b+m*(OAT−Indoor Set Point) model line previously described. There is only one load line because there is only one building in one region that is served by the HVAC system. The highest capacity line 84 and load line 86 converge at a design point 88.

The sensible load determination unit 66 determines a primary output, or sensible load, based on the load vs. capacity levels in the graph. If the environment creates a load of "L BTU/hr" at point 90, the staging algorithm will select the capacity line closest to "L" on the graph.

The output correction unit 70 may receive the output based on the sensible load from the sensible load determination unit 66. Various add-on features may be used to modify the output based on the sensible load determined by the sensible load determination unit 66. Add on features to control occupancy, latent load, uniform total run hours of compressors, etc., may be added to increase the robustness of the disclosure herein.

For example, the output correction unit 70 may receive a signal indicating relative humidity from the humidity sensor 58. If the relative humidity is greater than or equal to a humidity threshold (for example only, 60% humidity) or within a predetermined humidity range (for example only, 60-100% humidity), the output correction unit 70 determines a latent load request. The purpose of the latent load request is to modify the sensible load request with the intent to remove moisture from air and bring the relative humidity into a specified comfort level.

The latent load request takes into account temperature and humidity. The latent load request may be a load request equal to the stage provided by the sensible load request plus one stage. For example, if the sensible load request from the temperature correction unit 74 is 81.85 in the chart in FIG. 5, the latent load request may be 85.15. Similarly, if the sensible load request is 30.15, the latent load request may be 36.85 (FIG. 5). The latent load request may not always be the same compressor capacity bump or increase, such as a compressor speed bump or increase, in the case of a variable speed compressor. The bump may be different based on the relative humidity. For example, the bump may be greater the higher the relative humidity (i.e., the closer the relative humidity is to 100%).

If the output correction unit 70 implements an add-on feature, the "corrected" or updated output is communicated to the compressor staging unit 74. Otherwise, the output based on the sensible load from the sensible load determination unit 66 is communicated to the compressor staging unit 74. The compressor staging unit 74 determines a capacity request for each compressor in the multi-linked compressors 14. For example, using the example chart in FIG. 5, if the latent load request is 85.15, the system controller 46 will command the first two-stage compressor in position A to a high stage and will command the second two-stage compressor in position B to a low stage. Similarly, if the latent load request is 36.85, the system controller 46 will command the first two-stage compressor in position A to a low stage and will command the second two-stage compressor in position B to off. The compressor staging unit 74 and the system controller 46 then send the signal commands to the multi-linked compressors 14.

Figure 8:
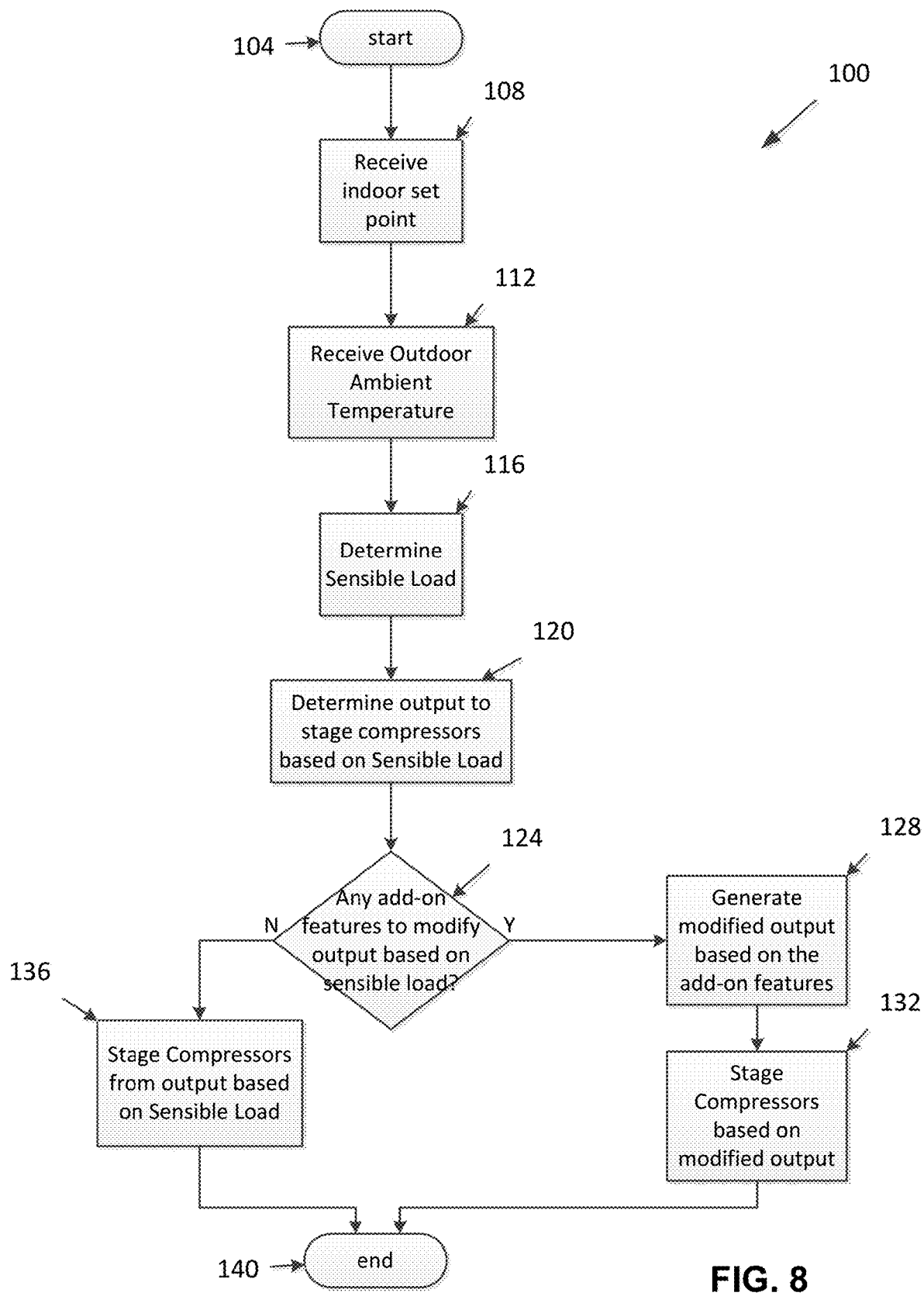
FIG. 8 is a flow chart illustrating steps for operating the compressor system of FIG. 1.

Now referring to FIG. 8, a flow chart for a method of controlling one or more compressors 100 is illustrated. The method 100 starts at 104. At 108, the indoor set point is received. The indoor set point may be, for example, the user commanded temperature 54 that is provided from the thermostat 54, from the computer or phone application (app), from any connected device, or from the schedule saved in a memory 62 in the system controller 46. In the cases of the user commanded temperature 54 being provided from the app or the schedule, the need for a physical thermostat is eliminated, further reducing costs and maintenance.

At 112, the system controller 46 receives the outdoor ambient temperature (OAT). The OAT 50 may be received from the OAT sensor 50, from the web based service providing live OAT data, or from any connected device. In the second case, the web based service provides real-time, live OAT data and removes the necessity for an OAT sensor, further reducing costs and maintenance.

At 116, the system controller 46 determines a sensible load. The sensible load may be determined from a sensible load model or equation which takes into account building parameters and/or characteristics, the indoor set point, and the OAT. The sensible load equation may be determined using physical parameters of the building such as, for example, the type and location of the walls, the size of the building, the number and sizes of rooms, the number, sizes, and location of windows, the number and location of the air conditioning vents, the amount, type, and location of insulation, the type of furniture, etc. The sensible load equation also may take into account the regional location of the building, the number of people living and/or working in the building, the number of electronics used in the building, and the sun load. Thus, the sensible load equation provides a load line that is a true representation of the intensity at which the HVAC system should operate. The sensible load equation may be generated using building energy modeling software or through a national laboratory.

Figure 7:
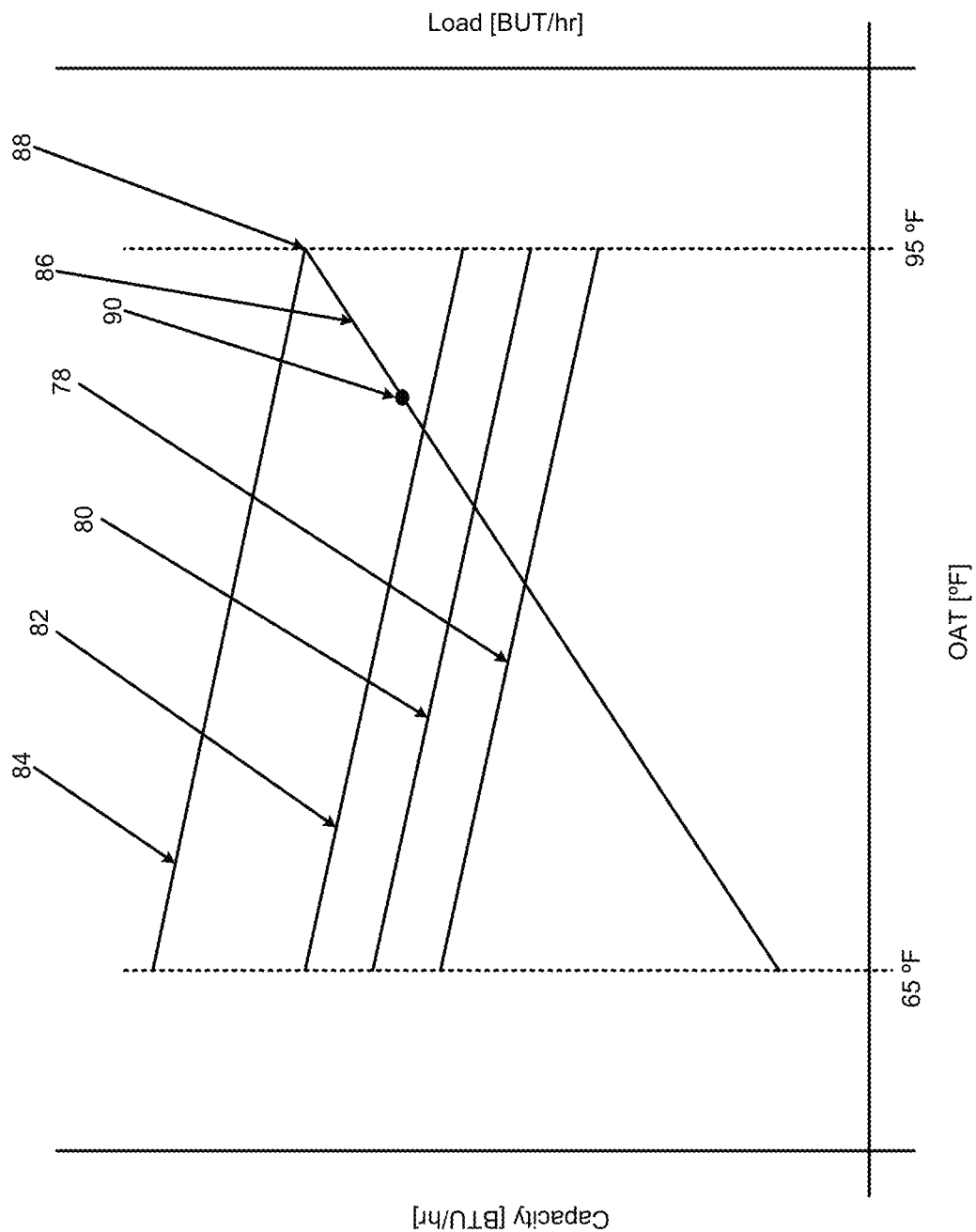
FIG. 7 is an example graph illustrating load lines and capacity lines for determining a sensible load according to the present disclosure.

At 120, the system controller 46 determines an output to stage the compressors based on the sensible load. The output based on the sensible load may be determined from a load vs. capacity graph (for example, FIG. 7). In the example of FIG. 7, if the environment creates a load of "L BTU/hr" at point 90, the staging algorithm will select the capacity stage such that the gap between load and capacity shrinks and tends to zero.

At 124, the system controller 46 determines whether any add-on features may be used to modify the output based on the sensible load value. For example, add on features to control occupancy, latent load, uniform total run hours of compressors, etc., may be added to increase the robustness of the sensible load.

If add-on features are enabled at 124, the system controller 46 generates a modified output based on the add-on features at 128. For example, in the case of latent load, the system controller 46 may receive a signal indicating relative humidity from the humidity sensor 58, from a connected device, or from a web based service. If the relative humidity is greater than or equal to a humidity threshold (for example only, 60% humidity) or within a predetermined humidity range (for example only, 60-100% humidity), the system controller 46 generates a modified output (for example, a latent load request). The purpose of the latent load request is to increase the load to overcool the environment and reduce the relative humidity.

The modified output may be a load equal to the stage provided by the output based on the sensible load request plus one stage. For example, if the sensible load request from the temperature correction unit 74 is 81.85 in the chart in FIG. 5, the modified output may be 85.15. Similarly, if the output based on the sensible load is 30.15, the modified output may be 36.85 (FIG. 5). The modified output may not always be the same compressor capacity bump or increase, such as a compressor speed bump or increase, in the case of a variable speed compressor. The bump may be different based on the relative humidity. For example, the bump may be greater the higher the relative humidity (i.e., the closer the relative humidity is to 100%).

At 132, the system controller 46 stages the compressors based on the modified output. The system controller 46 determines a capacity for each compressor in the multi-linked compressors 14 that achieves the modified output. For example, using the example chart in FIG. 5, if the modified output is 85.15, the system controller 46 will command the first two-stage compressor in position A to a high stage and will command the second two-stage compressor in position B to a low stage.

If add-on features are not enabled at 124, the system controller stages the compressors from the output based on the sensible load at 136. Thus, the system controller 46 determines a capacity for each compressor in the multi-linked compressors 14 that achieves the sensible load.

Following either step 132 or step 136, the method 100 ends at 140.

Example embodiments are provided so that this disclosure will be thorough, and will fully convey the scope to those who are skilled in the art. Numerous specific details are set forth such as examples of specific components, devices, and methods, to provide a thorough understanding of the embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In this application, including the definitions below, the terms controller or module may be replaced with the term circuit. The terms controller or module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A control system for controlling an output for at least one compressor, said control system comprising: a control unit receiving an indoor set point and an outdoor ambient temperature and determining a load request based on the indoor set point and the outdoor ambient temperature and not based on an indoor room temperature; and at least one compressor receiving control commands from the control unit based on the load request; and wherein the control unit includes a sensible load determination unit that determines a sensible load request based on a sensible load model, the indoor set point, and the outdoor ambient temperature, the sensible load model being determined based on at least one of a type and a location of a plurality of building walls, a size of the building, a number and a size of a plurality of building rooms, a number, a size, and a location of a plurality of building windows, number and a location of a plurality of air conditioning vents, an amount, a type, and a location of insulation, a type of furniture, a regional location of the building, a number of people living or working in the building, a number of electronics used in the building, and a sun load on the building.

2. The control system of claim 1, wherein the load request is a sensible load request.

3. The control system of claim 1, wherein the load request is a latent load request based on a sensible load request and a relative humidity output from a humidity sensor.

4. The control system of claim 1, wherein the control unit includes an output correction unit and the load request is a latent load request, the output correction unit modifying an output based on the sensible load request to account for a relative humidity to derive the latent load request.

5. The control system of claim 4, wherein the control unit commands the at least one compressor to the latent load request.

6. The control system of claim 1, wherein the control unit commands the at least one compressor to the sensible load request.

7. The control system of claim 1, wherein the control unit includes a sensible load determination unit that generates a sensible load request from a sensible load model determined based on a database of models calculated based on simulations of sensible loads in buildings located in a plurality of climate regions.

8. The control system of claim 1, wherein the control unit includes a sensible load determination unit that generates a sensible load request from a sensible load model retrieved from a sensible load database stored on a server remote from the control system.

9. The control system of claim 1, wherein the outdoor ambient temperature is determined from a signal from a temperature sensor.

10. The control system of claim 1, wherein the outdoor ambient temperature is provided from a web based service providing live outdoor ambient temperature data.

11. The control system of claim 1, wherein the indoor set point is received from a user interface.

12. The control system of claim 1, wherein at least one of the indoor set point and the outdoor temperature is received from a connected device.

13. The control system of claim 1, wherein the indoor set point is received from a schedule saved in a memory in the control unit.

14. A method for controlling an output for at least one compressor comprising: receiving, by the controller, an indoor set point and an outdoor ambient temperature; determining, by the controller, a load request based on the indoor set point and the outdoor ambient temperature and not based on an indoor room temperature; and controlling, by the controller, at least one compressor based on the load request; and further comprising determining, by the controller, a sensible load request based on a sensible load model, the indoor set point, and the outdoor ambient temperature, the sensible load model being determined based on at least one of a type and a location of a plurality of building walls, a size of the building, a number and a size of a plurality of building rooms, a number, a size, and a location of a plurality of building windows, a number and a location of a plurality of air conditioning vents, an amount, a type, and a location of insulation, a type of furniture, a regional location of the building, a number of people living or working the building, a number of electronics used in the building, and a sun load on the building.

15. The method of claim 14, further comprising controlling, by the controller, the at least one compressor based on a sensible load request.

16. The method of claim 14, further comprising controlling, by the controller, the at least one compressor based on a latent load request determined from a sensible load request and a relative humidity output from a humidity sensor.

17. The method of claim 14, further comprising generating, by the controller, a sensible load request from a sensible load model determined based on a database of models calculated based on simulations of sensible loads in buildings located in a plurality of climate regions.

18. The method of claim 14, further comprising generating, by the controller, a sensible load request from a sensible load model retrieved from a sensible load database stored on a server remote from the control system.

19. The method of claim 14, further comprising determining, by the controller, the outdoor ambient temperature based on a signal from one of a temperature sensor and a web based service providing live outdoor ambient temperature data.

20. The method of claim 14, further comprising determining, by the controller, the indoor set point based on a signal from one of a thermostat, a computer application, a phone application, and a schedule saved in a memory of the controller.

* * * * *